United States Patent [19]

Davis

[11] Patent Number: 4,791,511

[45] Date of Patent: Dec. 13, 1988

[54] DISK CARTRIDGE WITH SLIDE DOOR ENGAGEABLE IN EITHER OF TWO ORIENTATIONS

[75] Inventor: Marvin B. Davis, Colorado Springs, Colo.

[73] Assignee: Laser Magnetic Storage International Company, Colorado Springs, Colo.

[21] Appl. No.: 899,364

[22] Filed: Aug. 22, 1986

Related U.S. Application Data

[63] Continuation-in-part of Ser. No. 777,814, Sep. 19, 1985.

[51] Int. Cl.⁴ .................... G11B 5/012; G11B 23/02
[52] U.S. Cl. ............................ 369/291; 360/133; 360/97.01; 369/77.2; 206/444
[58] Field of Search ............... 360/97, 99, 133, 135, 360/86; 206/312, 444; 346/137

[56] References Cited

U.S. PATENT DOCUMENTS

| 4,546,397 | 10/1985 | Asami et al. | 360/133 X |
| 4,589,105 | 5/1986 | Nemoto et al. | 360/133 X |
| 4,622,607 | 11/1986 | Smith, II | 360/133 X |
| 4,680,662 | 7/1987 | Fukushima et al. | 360/133 |
| 4,688,206 | 8/1987 | Nakagawa et al. | 369/291 |

FOREIGN PATENT DOCUMENTS

| 0218231 | 4/1987 | European Pat. Off. . |
| 0244132 | 11/1987 | European Pat. Off. . |
| 58-17574A | 2/1983 | Japan | 360/97 |
| 58-50676A | 3/1983 | Japan | 360/97 |
| 2143072 | 1/1985 | United Kingdom | 360/133 |

Primary Examiner—John H. Wolff
Attorney, Agent, or Firm—Sheridan, Ross & McIntosh

[57] ABSTRACT

A disk cartridge for a disk drive has a slide door normally biased to the closed position. A recess on the door is positioned laterally offset from the horizontal center as to be oriented in either the upper or lower portion of the door depending on the orientation of the cartridge housing. The recess is engagable by a door opening mechanism on the disk drive to move the door to its open position wherein the disk media is exposed to the sensors in the disk drive. The recess is engagable by the door opening mechanism regardless of the orientation of the cartridge. A lock button supported on a resilient support engages the door recess when the door is in its closed position to thereby lock the door; the door opening mechanism engaging the lock button to unlock the door when engaging the recess.

10 Claims, 7 Drawing Sheets

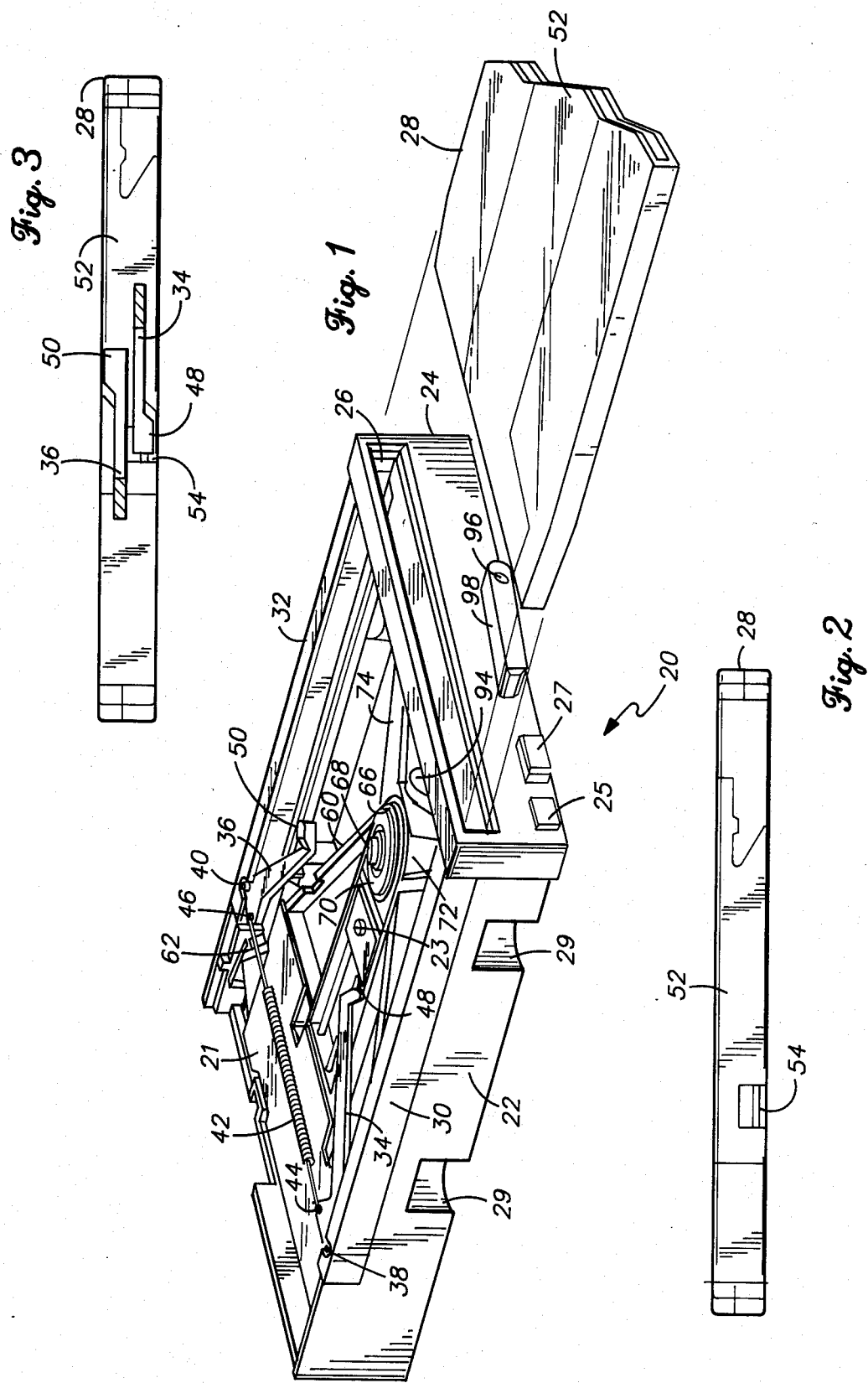

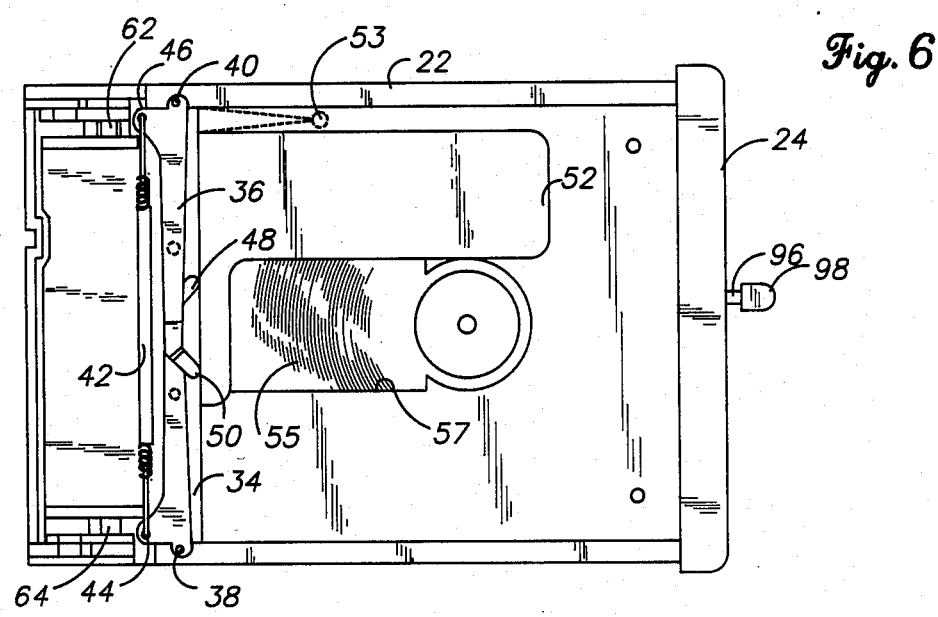
Fig. 6
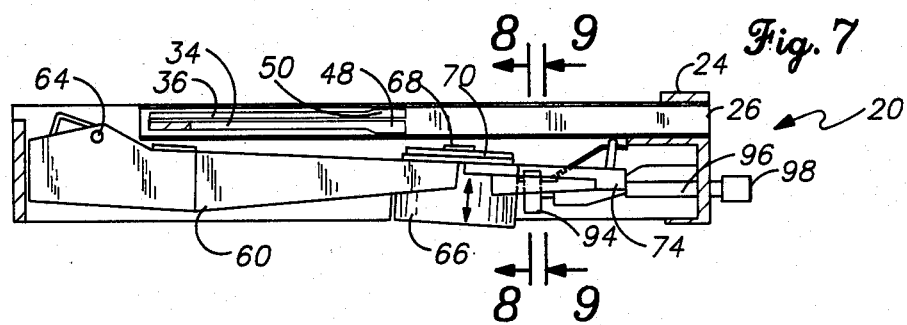
Fig. 7
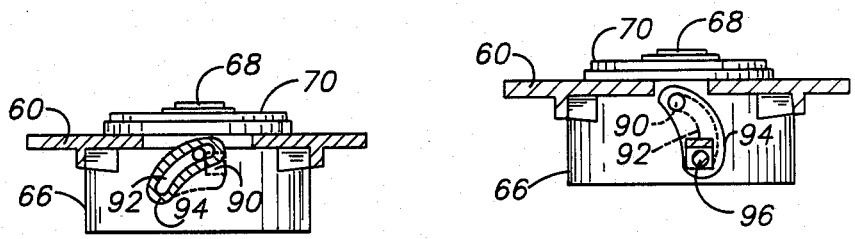
Fig. 8
Fig. 9

DISK CARTRIDGE WITH SLIDE DOOR ENGAGEABLE IN EITHER OF TWO ORIENTATIONS

This application is a continuation-in-part of my earlier application Ser. No. 777,814 filed Sept. 19, 1985.

This invention relates to disk drives, and particularly to disk drives used in computer applications. The invention is particularly useful in connection with cartridge disk drives of a compact nature, particularly optical drives.

Disk cartridges are well known in the computer arts. Basically, a disk cartridge comprises a cartridge housing containing a disk upon which data may be recorded. A door or slide is ordinarily provided in the cartridge housing which, when opened, permits access of the read and write mechanisms to the disk media to permit the recording or retrieving of data. The corresponding disk drive ordinarily includes a mechanism for opening the door or slide on the cartridge, and for engaging the disk within the cartridge to the spindle of a motor or other drive mechanism. The disk, when rotated by the drive mechanism, permits access of the disk media to the record or read mechanism.

In computer applications it is desirable to provide apparatus as compact and miniature as possible. However, physical constraints often limit the degree of compactness available to a given apparatus. Heretofore, cartridge disk drives have employed the principle of inserting the disk cartridge into the drive and moving the cartridge into engagement with a drive motor. For a cartridge approximately 6 inches square and ¼ inch thick (9 cu. in.), 36 cu. in. of space is required if the cartridge is to be moved ¾ inch. Thus, some 27 cu. in. are required within the disk drive merely to permit movement of the cartridge.

The present invention concerns a cartridge disk drive wherein the motor is moved to engage the cartridge, rather than the other way around. Thus, the present invention contemplates a disk drive having means for receiving and engaging the cartridge in a stationary position and means for moving the drive mechanism into engagement with the disk.

One feature of the present invention resides in the disk cartridge wherein the slide door includes a recess on the slide door laterally offset from the horizontal center so as to be engaged and operated regardless of the orientation of the cartridge.

Another feature of the present invention resides in the provision of a mechanism to open the slide door of the cartridge during insertion of the cartridge into the drive.

Another feature of the present invention resides in the provision of means to securely engage the disk to the drive mechanism.

Yet another feature of the present invention resides in the provision of a lock to lock the cartridge door in a closed position, said lock being operable to unlock the door by the drive mechanism used to open the door.

The above and other features of this invention will be more fully understood from the following detailed description and the accompanying drawings, in which:

FIG. 1 is a perspective view, partly in cutaway cross-section, of a disk drive in accordance with the present invention, a portion of a disk cartridge is illustrated for purposes of orientation;

FIGS. 2 and 3 are end views of a disk cartridge, illustrating the engagement of the cartridge door opening mechanism of the disk drive illustrated in FIG. 1;

Figure 4:
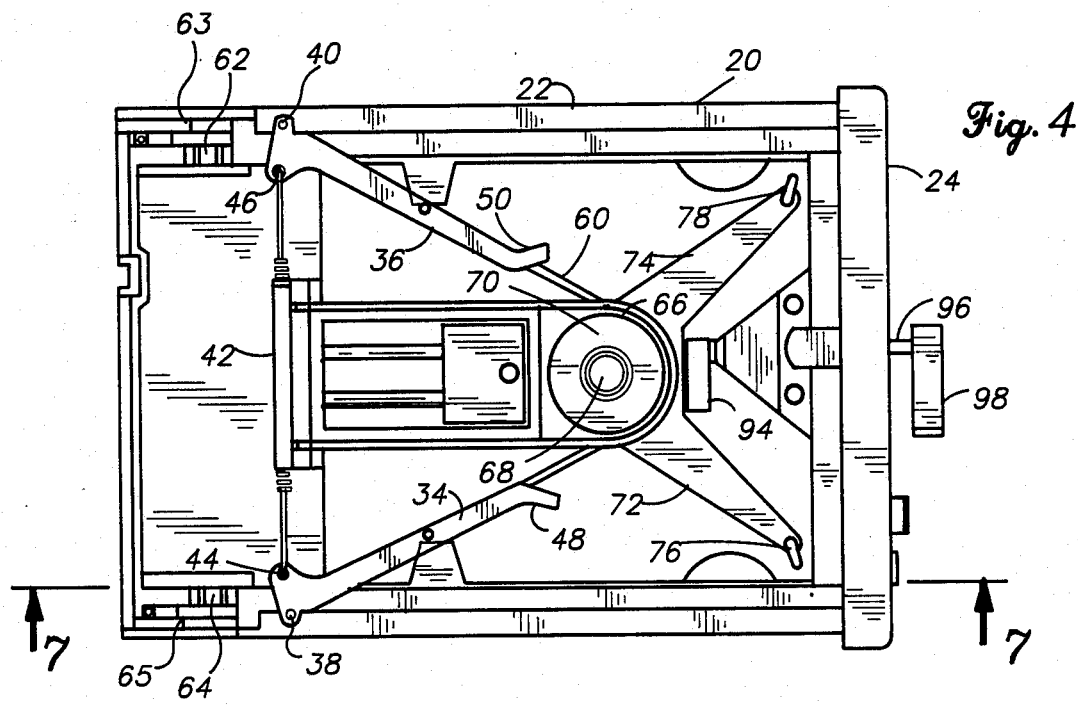
Figure 5:
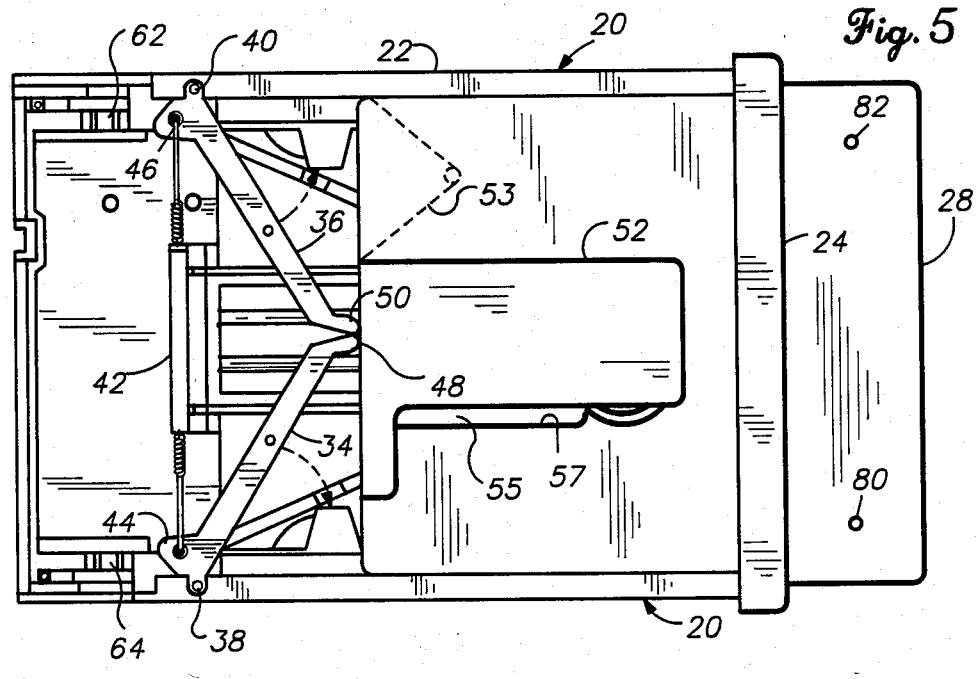
Figure 10:
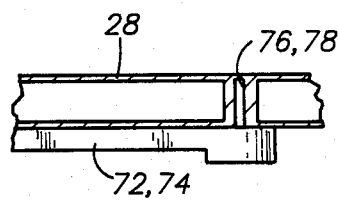
Figure 11:
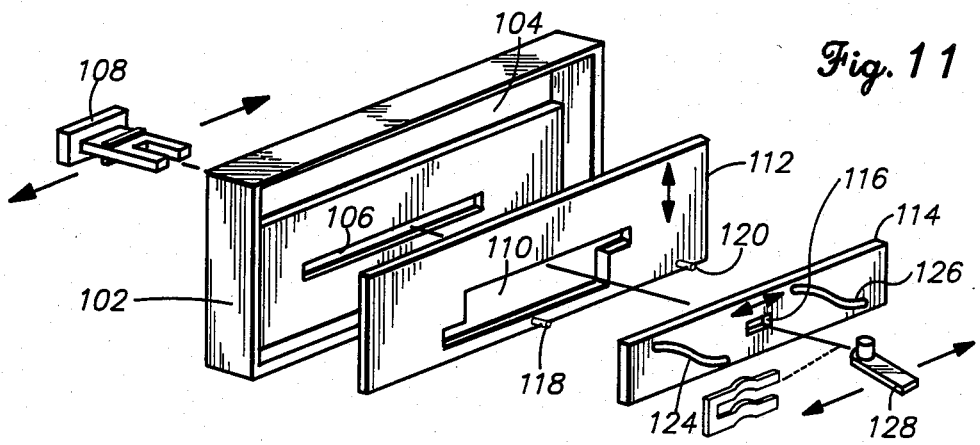
Figure 12:
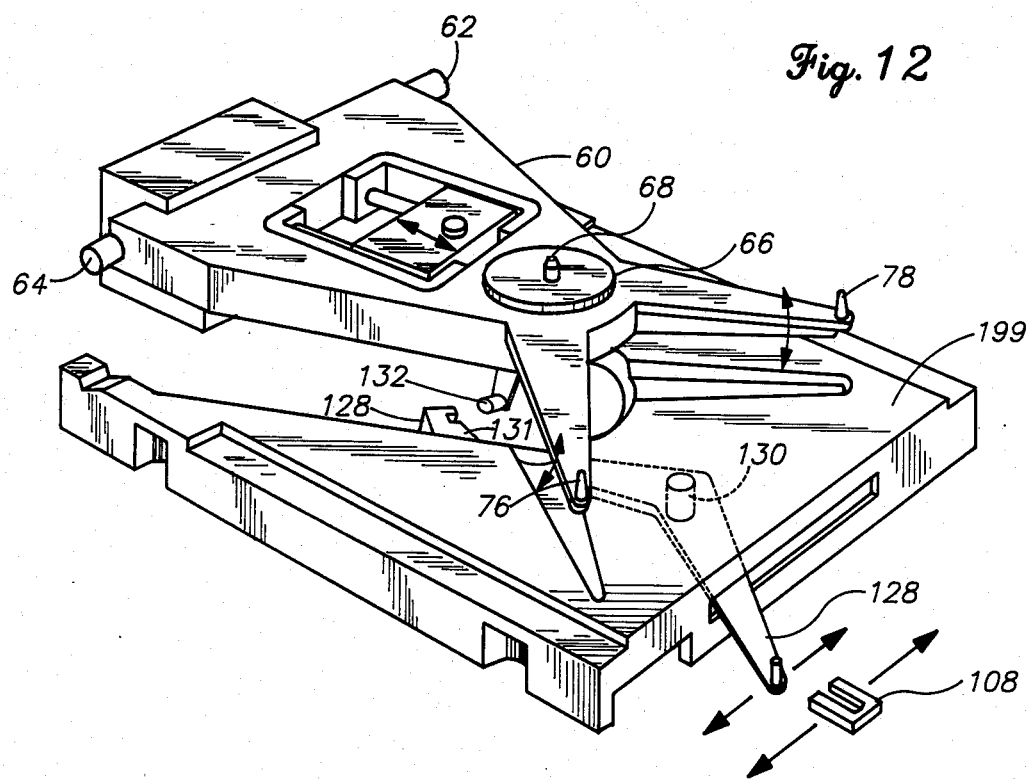
Figure 13:
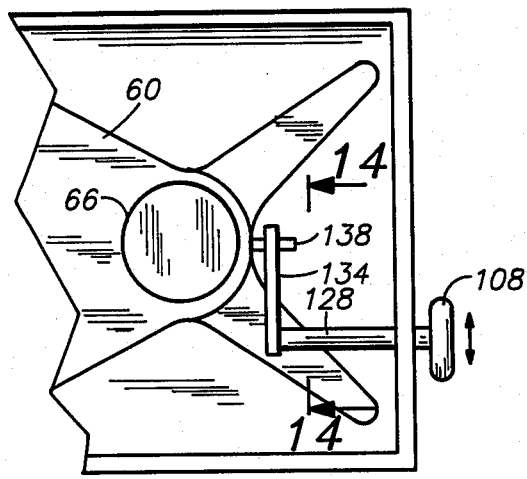
Figure 14:
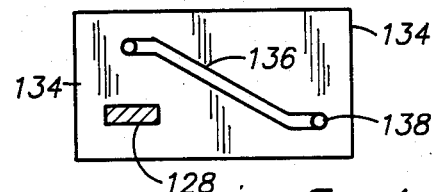
Figure 15:
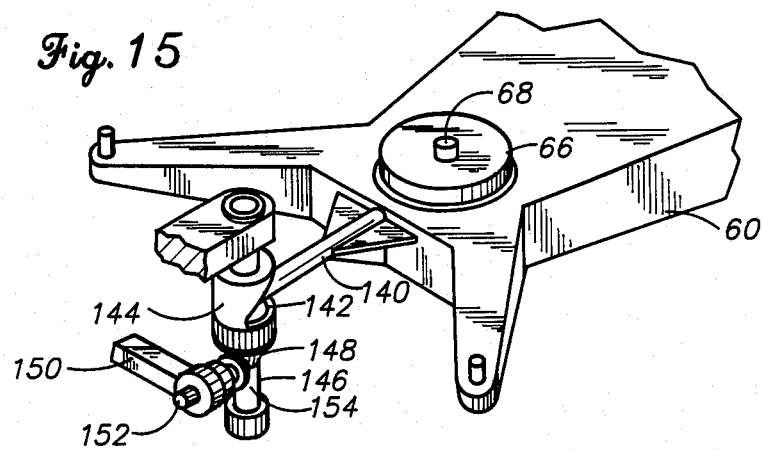
Figure 16:
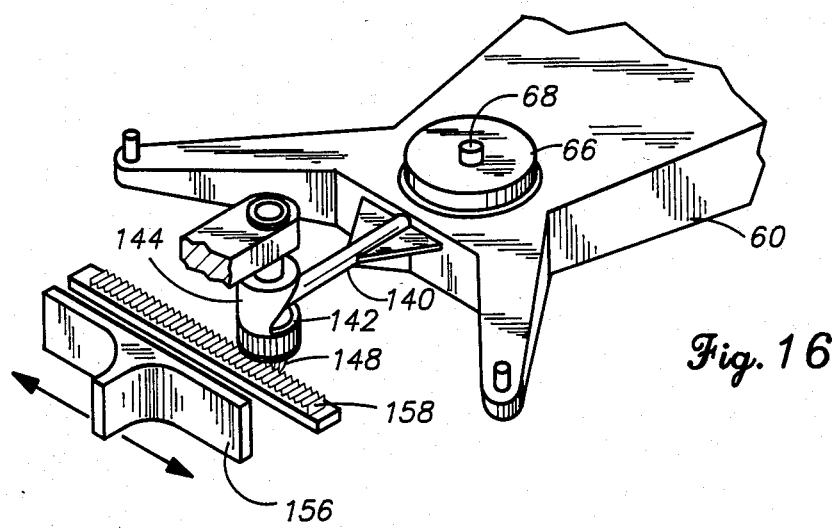
Figure 17:
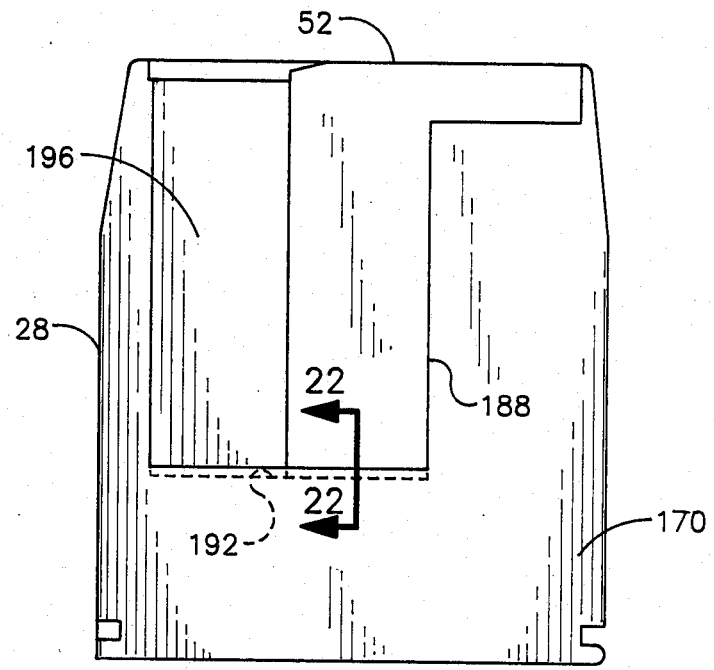
Figure 21:
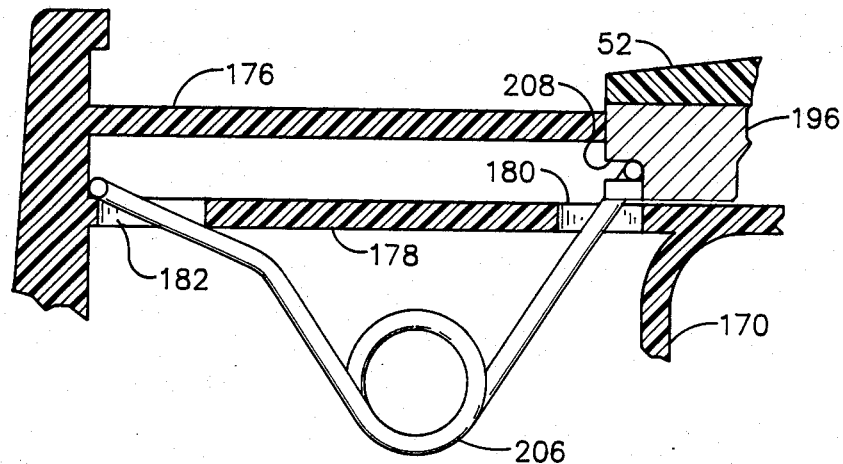
Figure 22:
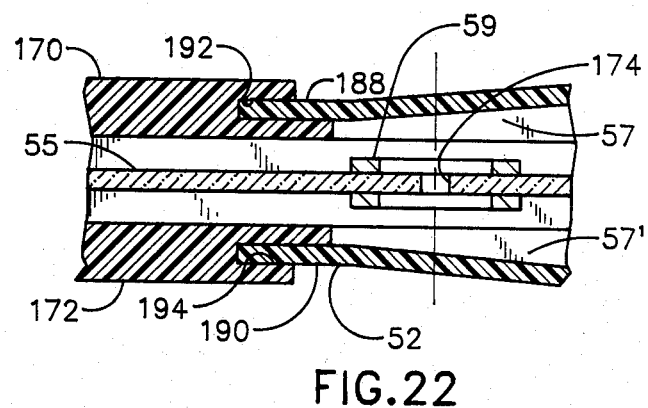

FIGS. 4, 5, and 6 are top views of the drive mechanism shown in FIG. 1, illustrating the disk cartridge in several steps of insertion;

FIG. 7 is a section view taken along line 7—7 in FIG. 4, illustrating the mechanism for raising and lowering the drive mechanism;

FIGS. 8 and 9 are section views taken at lines 8—8 and 9—9, respectively, in FIG. 7;

FIG. 10 is a view of a mechanism for engaging and positioning the cartridge, as shown in FIG. 7;

FIG. 11 illustrates an optional door mechanism for a disk drive according to the present invention;

FIG. 12 illustrates an optional mechanism for raising and lowering the drive mechanism;

FIGS. 13 and 14 illustrate another mechanism for raising and lowering the drive mechanism;

FIGS. 15 and 16 illustrate two other mechanisms for raising and lowering the drive mechanism;

FIG. 17 is a top view of a disk cartridge according to the presently preferred embodiment of the present invention for use with the disk drive illustrated in FIGS. 1–16; and FIGS. 18–22 are views of portions of the disk cartridge illustrated in FIG. 17.

Referring to the drawings, and particularly to FIG. 1, there is illustrated a disk drive 20 having a frame 22 having a front plate 24. A slot receptacle 26 is provided in face place 24 to receive a disk cartridge, illustrated generally at 28. Extrusions 30 and 32 form guides within the disk drive to receive the edges of cartridge 28 and to guide the cartridge into the drive. Arms 34 and 36 are pivotally mounted by pins 38 and 40 to frame 22, and are biased by tension spring 42 to the position illustrated in FIGS. 1 and 4. Spring 42 is fastened, at each end, to pins 44 and 46 on arms 34 and 36. Actuators 48 and 50 on arms 34 and 36 are arranged to engage the door of cartridge 28, as well as hereinafter explained.

Typically, the frame 32 will be enclosed within a cover (not shown) to protect the electronics, shown generally at 21, and the read/write heads, shown generally at 23. Push buttons and indicators 25 and 27 may be provided in face place 24 to provide controls for the electronics and heads to indicate their operation. Suitable feet or resilient mounting pads (not shown) may be mounted to receptacles 29.

As shown particularly in FIG. 2, the disk cartridge 28 includes a slide door 52 which may be slid (to the left in FIG. 2) to expose an opening in the top and bottom of the cartridge (not shown in FIG. 2) to permit access to the rotatable disk media (not shown in FIG. 2) within the cartridge housing. Slot 54 in slide door 52 is arranged to be engaged by one or the other of actuators 48 and 50 to slide the door from its closed to its open position, respectively. Slot 54 is laterally offset from the horizontal center of the cartridge housing so that it will be above or below the horizontal center, depending on the orientation of the cartridge housing. A spring (not shown in FIG. 2) biases the door toward its closed position.

With reference particularly to FIGS. 1-6, as the disk cartridge 28 is inserted in slot receptacle 26 of the disk drive and guided by extrusions 30 and 32 to a position illustrated generally in FIG. 6, one or the other of actuators 48 and 50 engages slot 54 on the cartridge door. If the cartridge is in the orientation illustrated in FIG. 2 so that slot 54 is on the lower portion of the slide door, the lower actuator 48 will engage the slot. Continued insertion movement of the disk cartridge will force arm 34 to pivot, sliding the door to the left (in FIG. 2) as the cartridge is moved to past the position illustrated in FIG. 5 to the position illustrated in FIG. 6. Actuator 50 merely slides across the door without hampering the operation. Conversely, if the orientation of the disk is turned over, as might be desired in reading or writing on the opposite side of the disk, slot 54 will be oriented to the upper portion of the slide door and upper actuator 50 engages slot 54 to open the slide door. In either case, the disk media 55 is exposed to the read/write heads 23 through the opened door opening 57. The hub 59 of the disk is also exposed.

Support 60 is mounted by pins or shafts 62 and 64 to frame 22. Springs 63 and 65 hold pins 62 and 64 into receiving slots within frame 22. Drive motor 66 is mounted to support 60 and includes a drive spindle 68 to adapted to engage the center hole of the disk (not shown) within cartridge 28. Magnetic ring 70 is provided to engage the disk in a manner to be hereinafter explained. Arms 72 and 74 (see particularly FIG. 4) carry engagement pins 76 and 78 arranged to engage apertures 80 and 82 in the disk cartridge 28 to hold the cartridge housing secure.

The support mechanism 60 is adapted to pivot on the mutual axis of pins 62 and 64 to move motor 66 from a disengaged position as shown in FIG. 7 to an engaged position whereby the spindle 68 engages the aperture (not shown) in the disk within cartridge 28. One mechanism for moving the motor and pivoting the support is illustrated particularly in FIGS. 8 and 9, wherein cam follower pin 90, mounted to support 60, engages an elliptical cam recess 92 of cam housing 94. Housing 94 is attached to knob shaft 96, which is rotated by rotation of knob 98. Rotation of knob 98 by 90° will force cam follower pin 90 to move within cam recess 92 of cam housing 94, thereby raising and lowering support 60.

In the operation of the apparatus, illustrated in FIGS. 1–9, the disk cartridge is inserted into opening 26 of the disk drive, and the slide door is opened by virtue of actuator 48 or 50. Knob 98 is rotated 90° bringing the motor spindle into engagement with the disk now exposed through the open door of the cartridge. The center hole of the disk is engaged by the spindle 68 of the motor, and magnetic ring 70 attracts a magnetic ring on the disk to clamp the disk to the ring. As the motor is raised to the disk, pins 76 and 78 engage apertures 80 and 82 in the cartridge housing (see FIG. 10) to secure cartridge 28 in its proper location.

FIG. 11 illustrates an optional door mechanism. Front plate 102 includes an aperture 104 for receiving the disk cartridge. Slot 106 is provided through which slide knob 108 is arranged to slide. The slide knob passes through opening 110 of door shutter 112 and is fastened to actuator plate 114 at opening 116. Cam follower pins 118 and 120 in shutter 112 engage S-shaped cam slots 124 and 126 in actuator plate 114. Conveniently, slide knob 108 may engage actuator arm 128 to raise and lower support 60, for example, using the mechanism illustrated in FIG. 12. As slide knob 108 is moved horizontally along the path defined by slot 106, actuator plate 114 also slides horizontally, carrying cam slots 124 and 126. Cam follower pins 118 and 120, engaged to slots 124 and 126, force shutter 112 upwardly or downwardly, as the case may be, to open and close opening 104.

FIG. 12 illustrates an alternative mechanism for raising and lowering support 60. In FIG. 12, actuator arm 128 is pivotally mounted to housing 22 at pivot 130 and includes a cam slide ramp 131 arrange to engage cam follower 132 on support 60 to raise and lower the motor mechanism and pivot support 60 about the pins 62 and 64.

FIGS. 13 and 14 illustrate another alternative raising mechanism wherein cam plate 134 is attached to actuator arm 128 of slide knob 108. Cam plate 134 includes cam slot 136. Cam follower pin 138, attached to support 60, engages cam slot 136 to raise and lower support 60 as plate 134 is moved horizontally.

FIG. 15 shows another alternative raising mechanism wherein cam follower pin 140 engages cam slot 142 in cam 144. Bevel gear 148, fastened to cam 144, on shaft 146, engages bevel gear 154 on knob shaft 152. Knob 150 fastened to shaft 152 is rotated to cause rotation of cam 144 to force cam follower 140 to cause raising and lowering of support 60.

FIG. 16 is similar to FIG. 15 except that instead of bevel gear 154, shaft 152 and rotatable knob 150 in FIG. 15, slide knob 156 is fastened to rack gear 158 which engages bevel gear 148 to raise and lower support 60.

Figure 18:
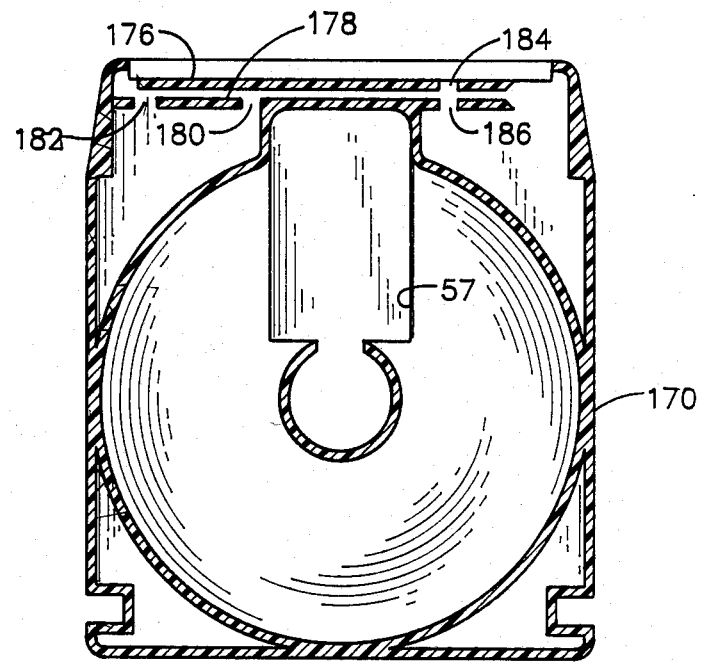

Referring to FIGS. 17 thru 22, there is illustrated a disk cartridge in accordance with the presently preferred embodiment of the present invention. The disk cartridge 28 includes a pair of mating plastic housing halves 170 and 172 (see FIG. 22) enclosing a recording disk 55 having a hub 59. Conveniently, hub 59 may comprise a pair of metal rings on each side of disk 55 for magnetic attachment to magnetic ring 70 of the motor assembly 66 (FIG. 4). Aperture 174 is arranged to be engaged by spindle 68 of the drive motor. FIG. 18 illustrates the inside of one of the housings halves, and shows that the housing halves are constructed of plastic within which is formed the window 57 embracing a radial section of the recording disk 55 (FIG. 22) and the hub structure 59. A pair of rails on 176 and 178 are formed in the upper or forward portion of each housing half, one of the housing halves having openings at 180 and 182 in rail 178 and at 184 and 186 in rails 176 and 178. As illustrated particularly in FIGS. 17, 19, 20, and 22 the door 52 is preferably constructed with plastic and is generally U shaped, having the leg portions of the U wrapping around each side of the cartridge (FIGS. 17 and 22) so that the leg portions 188 and 190 engage slots 192 and 194 in housing halves 170 and 172 respectively. Preferably, door 52 is constructed of the same plastic material as are housing half portions 170 and 172 for easy sliding within the slots formed at 192 and 194. As shown particularly in FIG. 17, slots 192 and 194 are located at the bottom portion of a recess 196 in each housing half to accommodate movement of door 52 between its open and close positions.

Figure 19:
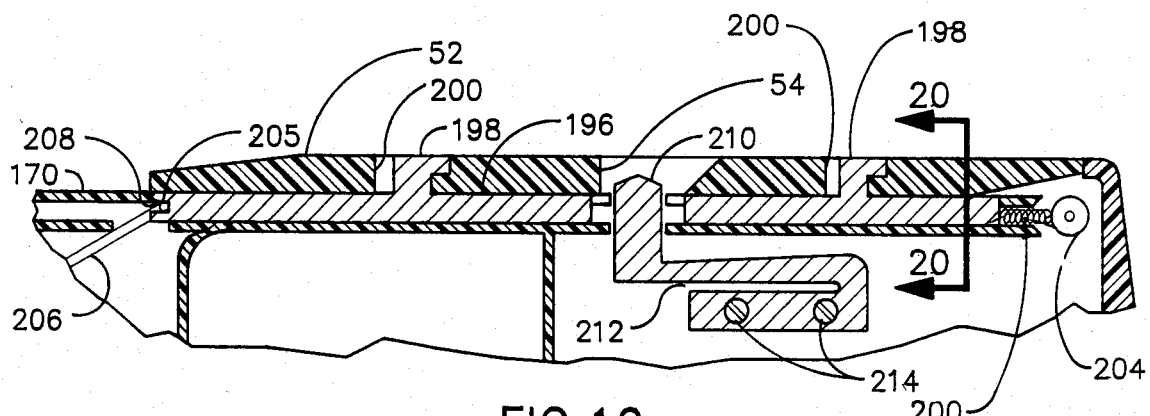
Figure 20:
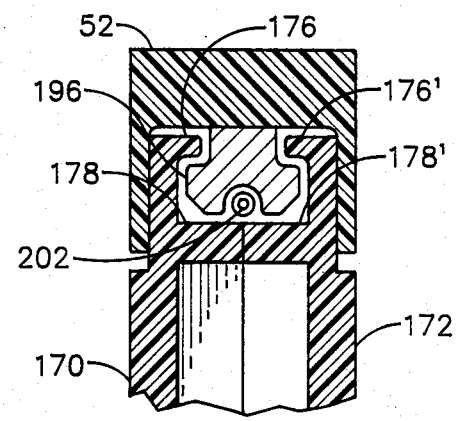

The main or body portion of the U-shaped door, illustrated particularly FIGS. 19 and 20, is fastened to metal slider 196, and the door and slider are fastened together by fitting of wedge members 198 of the slider to cavities 200 of the door. As shown particularly in FIG. 20, the slider 196 includes an enlarged body section received in the cavity formed by the rails 176 and 178 on housing half 170 and rails 176′ and 178′ formed on housing half 172. Optionally, tension spring 202 may be fastened to fastener 204 and extend the length of the slider to the end 205 of spring 206 to hold the door in its closed position illustrated in FIG. 19. Preferably, however, a coil spring held in compression, is positioned in slot 208 of slider 196 at one end, and between rails 176 and 178 of one of the housing halves at the other end. The arms of coil spring 206 extend through the previously described openings 180 and 182.

Preferably, a lock mechanism consisting of a medal button 210 intricately supported by a leaf spring to 212 mounted by fasteners 214 to one of the housing halves 170. Button 210 extends through the openings 184 and 186 in one of the housing halves 170 into the recess 54 of the door. The lock button 210 prevents accidental opening of the door mechanism 52. However, when an actuator arm 48 or 50 of the drive engages the recess 54, button 210 is depressed by the end of the actuator arm as to unlock the door to permit its opening. Thus, button 210 is supported by a "soft" spring 212 and arranged to be engaged by the actuator arms 48 and 50.

The present invention thus provides a mechanism for raising and lowering the drive mechanism of a disk drive into engagement with a cartridge, rather than the other way around. The mechanism is effective in operation and permits an even greater degree of compactness of a disk drive.

This invention is not to be limited by the embodiments shown in the drawings and described in the description, which are given by way of example and not of limitation, but only in accordance with the scope of the appended claims.

What is claimed is:

1. In a disk cartridge having a cartridge housing adapted for enclosing a disk, and having a door on said cartridge housing movable between an open position wherein, when a disk is enclosed in said cartridge, a surface of the disk is exposed to a read/write head in a disk drive to enable recording and/or reading of data recorded on said disk and a closed position wherein, when a disk is enclosed in said cartridge, the disk surface is not exposed to a read/write head, and bias means carried by said cartridge housing biasing said door to its closed position, wherein said cartridge housing is a generally flat housing having opposite first and second major sides and an edge surface, and wherein said door includes a first surface adjacent to a portion of said cartridge edge surface, the improvement comprising:
    a door opening engagement device on said first surface of said door comprising a recess on said first surface of said door, said recess being offset from the plane centered between said first and second sides to be oriented in the upper or lower portion of the door depending on the orientation of said cartridge housing.

2. Apparatus according to claim 1 wherein said cartridge housing has an access opening in each of said opposite sides permitting access to opposite sides of said disk, said door having first and second leg portions and a body portion arranged so that the leg portions of the door close the access openings in both sides of said cartridge housing when said door is in its closed position, said body portion extending over a portion of the edge surface of said cartridge housing, said recess being in said body portion.

3. Apparatus according to claim 2 wherein the door has one open position and said recess is engageable by a door opening mechanism in the disk drive to permit the door to be moved from its closed to its open position regardless of the orientation of the cartridge housing.

4. Apparatus according to claim 1 further including lock means comprising a lock button mounted to a resilient support, said resilient support biasing said lock button into said recess when said door is in its closed position to lock said door in its closed position, said lock button being engagable by a door opening mechanism in the disk drive to force said button out of said recess to unlock said door.

5. Apparatus according to claim 1 wherein the door has one open position and said recess is engageable by a door opening mechanism in the disk drive to permit the door to be moved from its closed to its open position regardless of the orientation of the cartridge housing.

6. Apparatus according to claim 5 further including lock means comprising a lock button mounted to a resilient support, said resilient support biasing said lock button into said recess when said door is in its closed position to lock said door in its closed position, said lock button being engagable by said door opening mechanism to force said button out of said recess to unlock said door.

7. A disk cartridge, as claimed in claim 1, further comprising:
    means for slidably attaching said door to said cartridge housing wherein said door is permitted to slide in a direction substantially parallel to said first major side.

8. A disk cartridge, as claimed in claim 7, wherein:
    said means for slidably attaching said door comprises a slider partially received in a cavity formed by at least one rail formed on an inside surface of said cartridge housing.

9. A disk cartridge for enclosing a disk usable in a disk drive having a read/write head, the cartridge comprising:
    a housing adapted for enclosing a disk by having a space therein, said space being substantially disk shaped, said housing being generally flat and having opposite first and second major sides and an edge surface;
    a door on said housing movable between an open position wherein said space is exposed to the read/write head in the disk drive and a closed position wherein at least a portion of said door is between said space and the read/write head, and wherein said door includes a first surface adjacent to a portion of said cartridge edge surface and having a recess therein; and
    lock means comprising a button and means for urging said button in a first direction wherein, when said door is in said closed position, said button extends into said recess for preventing opening the door.

10. A disk cartridge for enclosing a disk usable in a disk drive having a read/write head and also having unlocking means, the cartridge comprising:
    a housing adapted for enclosing a disk by having a space therein, said space being substantially disk-shaped, said housing being generally flat and having opposite first and second major sides and an edge surface;
    a door on said housing movable between an open position wherein said space is exposed to the read/write head in the disk drive and a closed position wherein at least a portion of said door is between said space and the read/write head, and wherein said door includes a first surface adjacent to a portion of said cartridge edge surface and having a recess therein; and
    lock means comprising a button and means for urging said button in a first direction wherein, when said door is in said closed position, said button extends into said recess for preventing opening the door and wherein said lock means is engagable by the unlocking means in the disk drive to force said button out of said recess for unlocking said door.

* * * * *